US006480763B1

(12) United States Patent
Lappos

(10) Patent No.: US 6,480,763 B1
(45) Date of Patent: Nov. 12, 2002

(54) METHOD AND SYSTEM FOR PROVIDING AN AIRCRAFT DRIFT ADVISORY

(75) Inventor: Nicholas D. Lappos, North Palm Beach, FL (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 09/736,780

(22) Filed: Dec. 14, 2000

(51) Int. Cl.[7] ........................... G02C 1/00; G08G 5/00; G01S 9/66

(52) U.S. Cl. ............................ 701/3; 701/16; 340/980; 340/954

(58) Field of Search ............................... 701/3, 16, 18, 701/217, 300; 340/980, 954, 948, 952, 953, 968, 951, 973; 345/8; 359/629, 630; 356/138, 139.03, 367, 614; 244/185

(56) References Cited

U.S. PATENT DOCUMENTS 3,609,299 A * 9/1971 Wright .................. 235/61 NV
3,648,225 A * 3/1972 Kritz et al. ................. 340/3 D
3,786,505 A * 1/1974 Rennie .................... 343/7 ED
3,835,299 A * 9/1974 Turney .................. 235/61 NV
3,869,913 A * 3/1975 Niskin ......................... 73/189
4,475,814 A * 10/1984 Marche ...................... 356/138
4,554,545 A * 11/1985 Lowe ......................... 340/980
4,667,196 A * 5/1987 Kaul .......................... 340/954
5,072,218 A * 12/1991 Spero et al. ................ 340/980

* cited by examiner

*Primary Examiner*—Tan Nguyen
*Assistant Examiner*—Dalena Tran
(74) *Attorney, Agent, or Firm*—Carlson Gaskey & Olds

(57) ABSTRACT

A system and method for issuing an aircraft drift advisory. In one embodiment, the system includes a head or eye tracker to monitor the rotational position of the pilot's line of sight with respect to the aircraft axis. The pilot's line of sight is compared to the direction of the aircraft. If the absolute value of the difference is greater than or equal to a predetermined angle, corresponding to the foveal cone of vision, the incremental aircraft drift distance is computed and used to update the cumulative aircraft drift distance. The cumulative aircraft drift distance is compared to the predetermined advisory criterion, which may be a constant, a uniform function of altitude or a function of altitude that is tied to a digital terrain map. When the cumulative aircraft drift distance equals or exceeds the advisory criterion, the pilot is given a drift advisory that the aircraft has drifted so as to prompt the pilot to adjust his line of sight to the direction of the drift. If the cumulative drift distance is less than the advisory criterion, the drift distance calculation is updated. In alternative embodiments, the drift distance is directly measured, and the time during which the drift distance equals or exceeds a threshold drift distance is compared to a criterion time to determine whether to issue the advisory. The system is designed to prevent a hovering aircraft from slowly drifting into contact with objects because the pilot is unaware of the drift for any reason.

35 Claims, 5 Drawing Sheets

METHOD AND SYSTEM FOR PROVIDING AN AIRCRAFT DRIFT ADVISORY

FIELD OF THE INVENTION

This invention relates generally to flight control systems, and more particularly, to methods for providing a pilot of an aircraft in flight with a drift advisory.

BACKGROUND OF THE INVENTION

An aircraft pilot often experiences a multitude of visual stimuli that compete for the pilot's attention during flight. Many of these stimuli are within the cockpit environment, most originating on the control panel. The control panel communicates a great amount of information, including numerous indications and warnings, to the pilot and merits a great deal of his attention. Particularly during mission scenarios, it may be necessary for the pilot to concentrate so fully on the internal cockpit environment that he may forego looking outside the aircraft for extended periods of time. When a pilot is thus focused and distracted from regularly looking to the external aircraft surroundings, particularly in the direction of aircraft movement, multiple risks can arise not the least of which is potential collision with other aircraft, buildings, structures or terrain features.

While applicable to any type of aircraft, a hovering aircraft such as a helicopter is particularly susceptible to heightened risks in such situations. A helicopter may experience a slow, virtually imperceptible (from a purely sensory perspective) drift in the horizontal or vertical plane that may go unnoticed by an otherwise preoccupied pilot. The horizontal drift may be along a longitudinal axis (i.e., to the fore or aft), a lateral axis (i.e., to the right or left), or a combination of these. Such drift may be caused by shifting winds or an unbalanced horizontal component (e.g., control settings which are not easily set to true zero such as rotary dial controls). Horizontal drift of a hovering aircraft may occur at a very slow speed, and if left unchecked, may result over time in a substantial displacement of the aircraft from the initial location. The usually slow rate of drift increases the likelihood that an otherwise occupied pilot will not observe the cumulative change in the aircraft's position, and therefore may not implement corrective action in a timely fashion. While the conditions for horizontal drift are most likely to occur with a hovering helicopter, other aircraft which hover (e.g., vertical takeoff or landing (VTOL) aircraft and dirigibles) are also subject to the dangers of unchecked horizontal drift.

Thus, there is a need to alert a potentially preoccupied pilot of a hovering aircraft that the aircraft has drifted. In particular, it is desirable to alert the pilot only after the aircraft has experienced drift sufficient to warrant concern. An alert given prior to a threshold of reasonable concern would likely come to be considered a "nuisance" and be ignored by pilots who may already have too many demands on their attention. Conversely, a late alert (i.e., very tolerant) would not fulfill its mission of keeping the pilot and aircraft safe. An appropriate balance must be struck.

SUMMARY AND OBJECTS OF THE INVENTION

The foregoing and other problems and deficiencies in aircraft control systems and displays are solved and a technical advance is achieved by the present invention for a drift advisory system.

It is an object of this invention to provide an aircraft drift advisory system apparatus and method adapted to measure a perspective angle representational of a direction of a pilot's line of sight in reference to an aircraft longitudinal axis; a navigation system adapted to measure aircraft altitude and drift vector (velocity and drift direction); and, a data processor coupled with the apparatus and the navigation system, the data processor being adapted to: define a foveal cone comprising a cone swept out by a foveal angle rotated about the line of sight; calculate a risk measure whenever the drift direction is not contained within the foveal cone; and, issue a drift advisory that starts when the risk measure equals an advisory criterion and stops when the drift direction reenters the foveal cone.

It is a further object of the present invention to provide a system wherein the risk measure is a drift distance, the drift distance being calculated by integrating the drift velocity over time.

It is a further object of the present invention to provide a system wherein the navigation system further comprises a global positioning system adapted to provide an aircraft location as projected on the earth surface and the drift vector; the data processor is in communication with a terrain map containing a detailed digital topographic description of an earth surface; and, the risk measure is an approach distance to a nearest object as determined from the aircraft location and the terrain map.

It is a still further object of the present invention to provide a system wherein the perspective angle of the pilot's line of sight is measured as a rotational orientation of the pilot's head or alternatively as a rotational orientation of the pilot's eye-line of sight.

It is a still further object of the present invention to provide a system wherein a data processor is coupled to the navigation system, the data processor being adapted to

- calculate a difference between an aircraft drift distance in a spatial dimension and a corresponding threshold distance;
- calculate the time interval since the aircraft drift distance was last less than the corresponding threshold distance;
- compare said time interval to a criterion time; and
- issue a drift advisory when said time interval equals or exceeds said criterion time.

The spatial dimension of the present invention can be lateral, longitudinal, or vertical.

The time interval of the present invention can, in alternative embodiments be set to zero when the pilot uses an aircraft control mechanism to alter the location of said aircraft in the corresponding orthogonal dimension.

The advisory criterion of the present invention can, in alternative embodiments, be implemented as a constant or as a predetermined function of the aircraft altitude.

The drift advisory of the present invention can, in alternative embodiments, be implemented as a visual advisory or an auditory advisory.

BRIEF DESCRIPTION OF THE DRAWINGS

The foregoing and other features and advantages of the present invention will become more apparent in light of the following detailed description of exemplary embodiments thereof, as illustrated in the accompanying drawings, where.

DETAILED DESCRIPTION OF THE DRAWINGS

Figure 1:
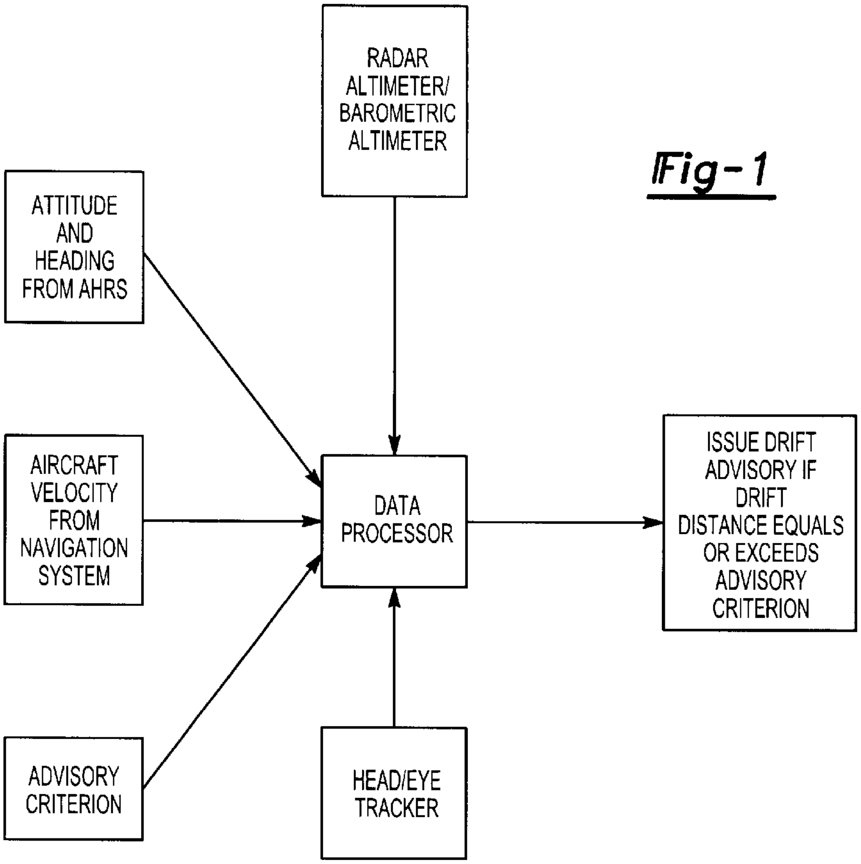
FIG. 1 is a block diagram showing the components of a drift advisory system according to an illustrative embodiment of the present invention.

A schematic implementation of the present invention according to an illustrative embodiment is shown in FIG. 1. A Data Processor (101) interfaces with and collects a variety of inputs from a number of sources. The aircraft altitude is received from a standard radar altimeter (102). Aircraft attitude and heading are received from the Attitude Heading Reference System (AHRS) (103) and aircraft velocity from the aircraft navigation system (104). A predetermined advisory criterion (105) is supplied to provide the system with a standard for determining under what conditions to give a drift advisory. A head tracking subsystem (106) provides information on the direction in which the helmet, and by approximation, the pilot's line of sight, is directed. Time interval data are calculated internally to the data processor or alternatively provided by an external clock. The input data are processed by a Data Processor (101) which calculates the distance drifted since the pilot last turned his head in the direction of the aircraft's drift. If this distance is greater than the applicable Advisory Criterion, the pilot is given a drift advisory (107).

Figure 2:
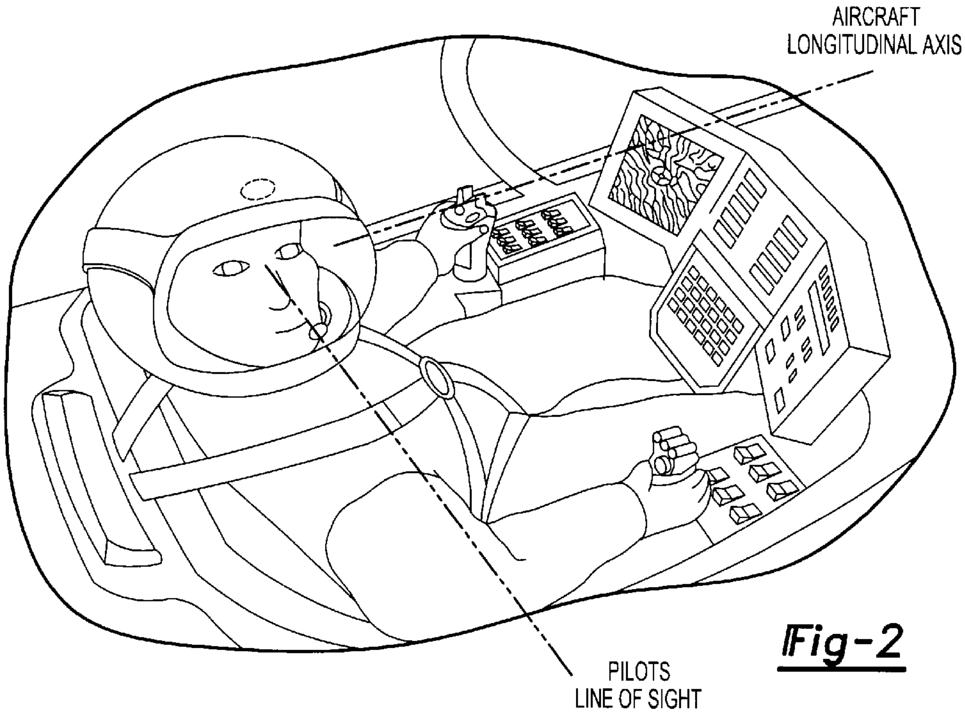
FIG. 2 is an example of an implementation of the pilot head tracking subsystem according to an illustrative embodiment of the present invention.

The pilot head tracking subsystem of the illustrative embodiment is depicted in FIG. 2. The pilot wears a helmet that is adapted to move with his head. The headtracking subsystem is typically comprised of a device which is mounted to the pilot's helmet (201), as is known in the art. This subsystem may use infrared light or some other electromagnetic frequency, magnetic laser or other technology for head tracking. The head tracking subsystem is adapted to encode the direction of the pilot's head rotation via the line of sight (202) relative to the aircraft longitudinal axis (203) on a preset time interval basis. Alternatively, eye tracking devices as are well known may be used as part or in lieu of the head tracker subsystem to more directly monitor the pilot's line of sight.

The system and method of the present invention in the various embodiments which are discussed herein, derives and presents a technique for detecting and alerting unintended drift of an aircraft using the fundamental schema of FIGS. 1 and 2. Approximations are made as to the direction of the pilot's line of sight and an allowable angular deviation of the direction of the aircraft drift is established as part of the technique to determine issuance of an advisory when a calculated cumulative drift distance exceeds a predetermined advisory criterion. When the pilot redirects their line of sight to come within the allowable angular deviation, the advisory is silenced.

With regard to the allowable angular deviation, it is recognized that the foveal cone of the human visual system comprises an effective cone of vision swept out by the rotation of the fovial angle about the line of sight. In an illustrative embodiment of the present invention, the allowable angular deviation is deemed to be the foveal angle, where the pilot is presumed to see everything that is swept out by the foveal angle from the line of sight, i.e., the pilot is presumed to see everything within the foveal cone. Conversely, for purposes of this discussion, the pilot is presumed not to see anything outside the foveal cone. The foveal angle is commonly assigned a value of 20°, but may have a range of values including 15°–25°. In alternative embodiments, however, any angular deviation may be used.

Figure 3:
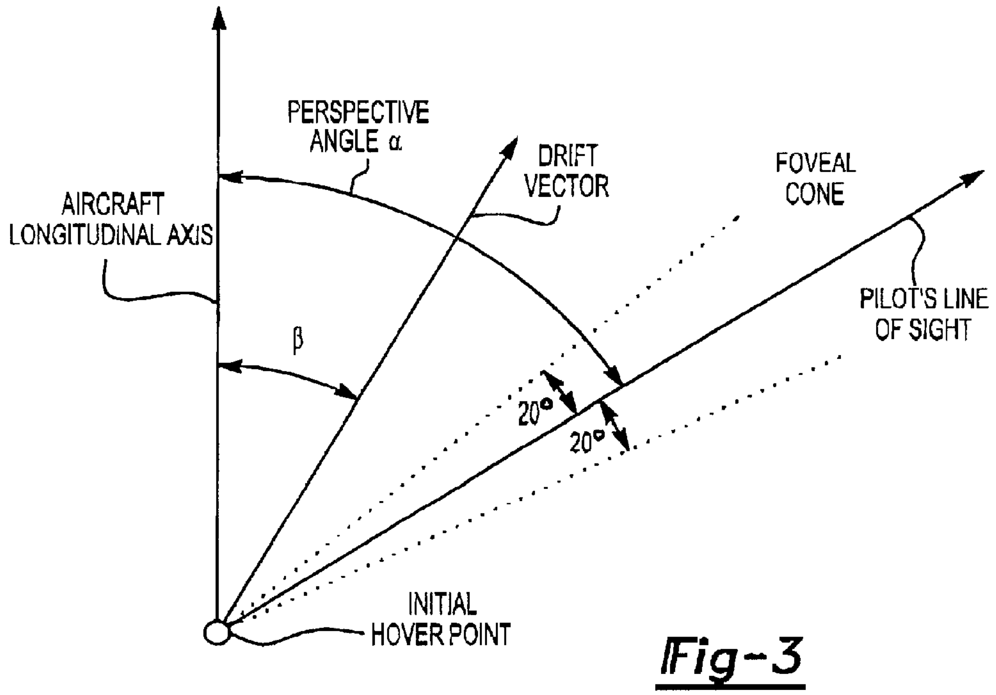
FIG. 3 is an angular reference system for a pilot's line of sight and drift velocity relative to the aircraft longitudinal axis according to an illustrative embodiment of the present invention.

Examples of the various directional entities relevant to this invention are illustrated in FIG. 3. The direction of the pilot's line of sight (301), shown here with respect to the aircraft longitudinal axis $A_L$ (302), with a perspective angle $\alpha$ (303). The foveal cone (304) is defined in this example by a 20° angle to the pilot's line of sight (301). The direction of the drift vector (305) is measured as angle $\beta$ with respect to the aircraft longitudinal axis $A_L$ (302).

This scheme implemented in the present invention suggests four sets of situations concerning the orientations of the pilot's line of sight S, drift vector V, and aircraft longitudinal axis $A_L$ as represented in FIGS. 4*a* through 4*d*.

Figure 4A:
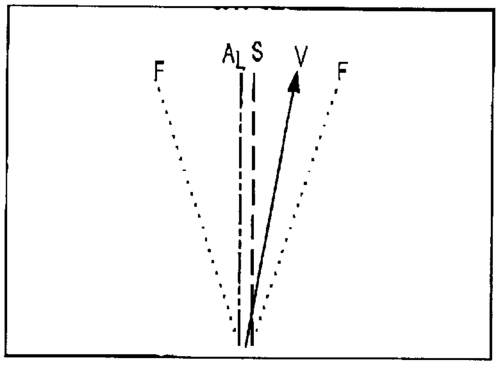
FIGS. 4*a*–4*d* are a set of figures showing the relative orientations of a pilot's line of sight, drift velocity, and aircraft longitudinal axis according to an illustrative embodiment of the present invention.
Figure 4B:
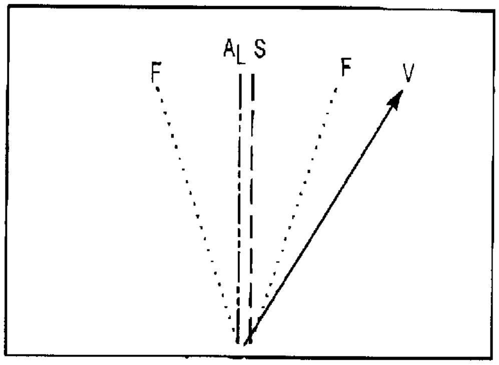

In FIGS. 4*a* and 4*b*, the pilot is looking forward, along the aircraft longitudinal axis $A_L$, and the aircraft longitudinal axis $A_L$ and the pilot's line of sight S are substantially coincident. This is the most common situation encountered, as the control panel is for purposes of this invention, deemed to be located substantially on the aircraft longitudinal axis $A_L$. In FIG. 4*a*, is shown a situation where the drift vector V is within the foveal cone F-F in which case the time and the cumulative drift distance are reset. In FIG. 4*b*, the drift vector V is shown outside the foveal cone F-F, and the drift distance calculation is updated for purposes of determining to issue the drift advisory. Should the drift vector V of FIG. 4*b* come back within the foveal cone F-F, the situation depicted in FIG. 4*a* arises and time and cumulative drift distance are reset.

Figure 4C:
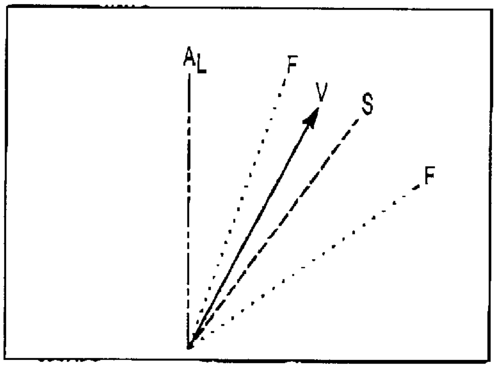
Figure 4D:
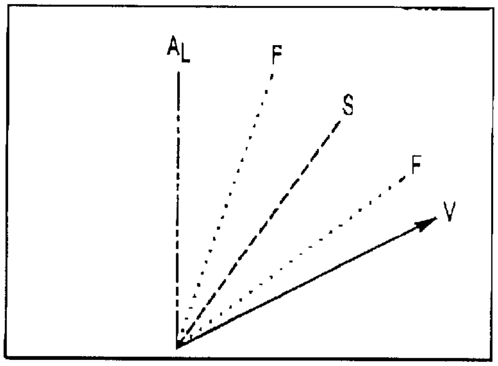

FIGS. 4*c* and 4*d* depict laterally directed lines of sight, e.g., where the pilot is looking off to one side of the aircraft. In this scenario, the pilot's line of sight S is no longer coincident with the aircraft longitudinal axis $A_L$. In FIG. 4*c*, the drift vector V is illustrated within the foveal cone F-F and in FIG. 4*d* it is not. In FIG. 4*c*, similarly as for FIG. 4*a*, time and the cumulative drift distance are reset. In FIG. 4*d*, similarly as for FIG. 4*b*, drift distance calculation is updated for purposes of determining to issue the drift advisory. Again, should the drift vector V of FIG. 4*d* come back within the foveal cone F-F, the situation depicted in FIG. 4*c* arises and time and cumulative drift distance are reset.

Figure 5:
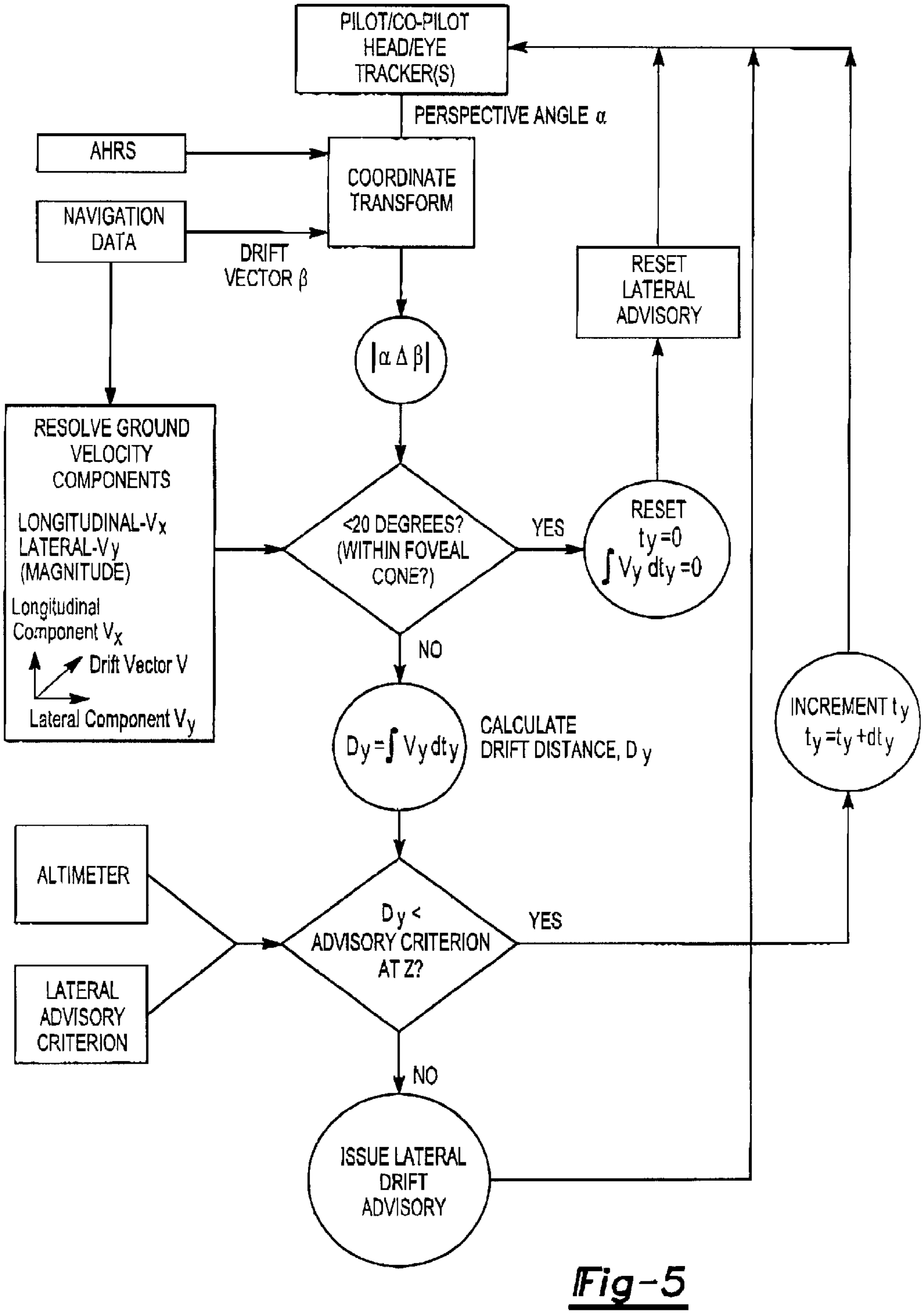
FIG. 5 is a flow chart of the drift advisory system for lateral drift according to an illustrative embodiment of the present invention.

A detailed functional description of the illustrative embodiment of the present invention as applied to lateral drift is now discussed with reference to FIG. 5.

The pilot head tracking subsystem measures the angle of the pilot's line of sight with respect to the aircraft longitudinal axis, herein referred to as the perspective angle $\alpha$ (501). It will be understood that, while one pilot is depicted in the illustrative embodiment, the invention can be adapted to include provisions for two-pilot aircraft, in which case the angle of either pilot's line of sight or the angles of both pilots' lines of sight, adjusted for seat position relative to the aircraft, are measured with respect to the aircraft as is known. The AHRS provides the aircraft's attitude, i.e., orientation with respect to the horizon, and heading information (502). The aircraft navigation references (503) provide the direction and magnitude of the aircraft's drift velocity as a drift vector where the angle between the drift vector (direction) and the aircraft longitudinal axis is identified as $\beta$. The Data Processor receives the pilot head tracking data and the aircraft attitude data and performs a coordinate transform to assure that the direction of the pilot's line of sight $\alpha$ and drift direction $\beta$ are measured with respect to consistent references (504). The Data Processor then computes the difference between the consistently resolved angles $\alpha$ and $\beta$ and determines the absolute value of this difference (the "delta") (505) where the absolute value function causes a negative difference to have a positive value (as though dropping the negative sign) and has no effect on a positive value, resulting in only the magnitude of the delta.

The Data Processor compares the absolute value of the difference between the direction of the aircraft drift vector $\beta$ and the perspective angle $\alpha$ to the foveal angle, here nominally 20° (506). If the absolute value of the difference $\alpha-\beta$ is less than 20° (i.e. $|\alpha-\beta|<20°$), the direction of the aircraft velocity vector is deemed with the pilot's foveal cone of vision and the pilot is presumed to have seen any potential threat within that zone. Therefore, the time-cumulative drift distance (507) and advisory flags (515) are reset to zero, the calculation of drift distance for this line of sight measurement is reset and calculation continues anew (501). If the absolute value of the difference $\alpha-\beta$ is greater than or equal to 20° (i.e., $|\alpha-\beta|\geqq 20°$), the direction of the aircraft velocity vector is deemed outside the pilot's foveal cone of vision and the pilot is presumed to not be able to see any potential threat within that zone and the calculation of drift distance proceeds for the lateral (y) direction (509) where the Data Processor integrates the drift velocity over time to compute the drift distances as follows. The navigation references provide the ground velocity magnitude to the Data Processor (508), which then resolves this into component velocities: the longitudinal component ($V_x$) parallel to the aircraft axis and the lateral component ($V_y$) perpendicular to the aircraft axis. The Data Processor computes the differential drift distance $dD_y$ by multiplying the drift velocity magnitude supplied by the navigation references, $V_y$, by the time increment, dt. The cumulative drift distance is then updated by adding the current value of drift distance $D_y$ to the differential drift distance $dD_y$ (509).

A Lateral Advisory Criterion (511) is provided which is used for determining whether and when to provide an advisory based on total lateral drift distance. The Advisory Criterion may or may not be a function of altitude (as will be discussed infra), which is supplied by the altimeter (510). The updated cumulative drift distance is then compared to the Advisory Criterion (512). If the lateral drift distance $D_y$ is less than the Advisory Criterion, no advisory is given yet. If the drift distance $D_y$ is equal to or greater than the Advisory Criterion, the Data Processor initiates a drift advisory (513). Time ($t_y$) is incremented by $dt_y$ (514) and the next line of sight measurement is taken as calculation continues (501). Triggered advisories are posted until the pilot head tracker indicates that the pilot has taken remedial action, e.g., by rotating his line of sight to bring the aircraft velocity vector direction into the foveal cone or alternatively, a reset function can be incorporated where the pilot can manually reset the advisory flag.

The mechanism of the advisory may be in any suitable form as will be understood. For example, the advisory can be visual in the form of a light on the control display or caution advisory panel or auditory as an alarm or a warning voice message. In either case, while not critical, it is preferable that distinct advisories be available for longitudinal and lateral advisories. Alternatively the advisory can be a graphic figure or text or other indication on a tactical display (created by a display generator unit (DGU)) which indicates the magnitude and direction of drift to the pilot or can prompt the pilot as to which way to look or to introduce a corrective input to the aircraft controls to reset the advisory condition.

Figure 6:
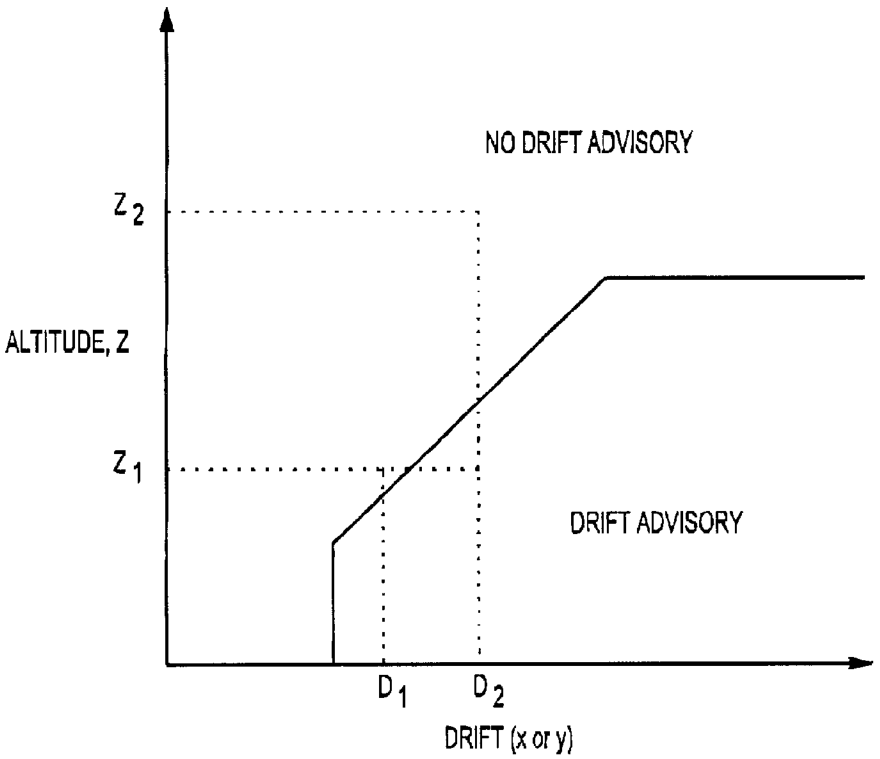
FIG. 6 is an example of a drift advisory criterion profile according to an illustrative embodiment of the present invention.

The Advisory Criterion can be implemented in a variety of ways. In the illustrative embodiment, a longitudinal and/or lateral Advisory Criterion is a predetermined function of the aircraft altitude as shown in FIG. 6, based on the assumption that as altitude drops, the density of ground obstacles that could pose a hazard to an aircraft that has drifted increases. At a given altitude Z, as provided by the aircraft altimeter, there is a corresponding Advisory Criterion. Drift distance-altitude combinations (D-Z) that fall below the profile cause the Data Processor to issue a drift advisory, while those above the profile result in no drift advisory. Therefore for example, at $Z_1$, a drift distance of $D_1$ will not result in a drift advisory, but as the drift distance increases to $D_2$, the drift advisory will be given. Similarly, for drift distance $D_2$, at a height of $Z_2$, no drift advisory is issued. This profile is provided by way of example and any profile as will be understood by one of skill on the art can be implemented.

In an alternative embodiment, longitudinal and lateral Advisory Criteria are established as an absolute threshold drift distance along the longitudinal or lateral axes that is used to determine when to initiate an advisory and which can be a constant. For example, the Advisory Criterion might have a predetermined constant value of 25 feet regardless of aircraft altitude, where, when the aircraft has drifted at least 25 feet in any direction (longitudinal or lateral) during the time interval since the pilot has last aligned his line of sight within 20° of the direction of drift, a drift advisory is given.

In alternative embodiments, different references can be used for advisory resolution including aircraft and ground references. Regardless of which reference is chosen, consistent resolution of the drift vector and perspective angle with respect to the same reference must be maintained.

For example, when resolving about the aircraft reference, the drift advisory "loop" is closed about the aircraft itself. Aircraft navigation information including altitude, lateral and longitudinal velocity are determined, for example, by onboard navigation equipment, such as a Doppler system or accelerometer sensors. A perspective "zero" is determined by initializing the head tracker position to an instantaneous value and the foveal cone is centered about this zero. Lateral and/or longitudinal drift are integrated over time to determine a drift distance and advisories are issued when the aircraft has drifted a predetermined amount (as determined by, e.g., the drift advisory profile) in a particular direction (x or y) where the pilot has not looked beyond the foveal cone in that particular direction (as determined by the perception angle) for a predetermine amount of time. The system of the present invention can simply time the period starting when the pilot turns his line of vision to exclude the drift velocity vector from within the foveal cone. If this time period is less than a threshold Minimum Perception Period, the calculation is reset. Where this period exceeds the Minimum Perception period, calculation towards issuance of a drift advisory proceeds and the calculation continues as long as the drift vector remains outside the foveal cone. When the drift vector remains continuously outside the foveal cone for a Maximum Perception Period, the drift advisory will be issued and reset when the drift vector is brought back within the foveal cone by the pilot turning his head. The selection of the Minimum and Maximum thresholds can be set as desired with the most beneficial values selected to prevent nuisance advisories.

Alternatively, as in the illustrative embodiment, when resolving about a ground reference, aircraft position is translated to represent the aircraft as a position on the ground. Aircraft velocity and drift distance are measured either by a Global Positioning System (GPS) where no earth reference transformation is necessary or as in the case for aircraft reference, drift is integrated over time in either axis (x or y) from a start position and position drift (as projected on the ground) is calculated. Advisories are then issued as discussed. In these cases, the Aircraft Drift Advisory System receives data on the aircraft's location from the GPS as is known and suitably adapted to the particular aircraft. The GPS provides the aircraft's location as projected on the surface of the earth. The GPS also supplies a drift vector V, as a substitute for the drift velocity data derived from the navigation references as described above.

Ground resolution is particularly useful when deployed, for example, in conjunction with terrain or tactical maps where potential obstacles of concern are identified by their fixed earth (longitude/latitude) positions. In these embodiments, a predetermined terrain map is for example is used by the Data Processor in combination with the GPS data to determine when to issue an advisory. The terrain map is a database containing highly detailed digital topographic data on the ground location and elevation of surface features, buildings and structures. Once the GPS provides the aircraft's location, the Data Processor accesses the terrain map to determine distances to features that may constitute a threat to an airborne aircraft in e.g., a mission scenario. In one variation of this embodiment, the Advisory Criterion is compared to the distance between the aircraft and the feature (rather than the time-integrated velocity described above), and a drift advisory is issued if that distance is less than the Advisory Criterion (rather than equal to or greater than the Advisory Criterion as described above). The Advisory Criterion can be selected as a safe minimum distance to known objects.

Figure 7:
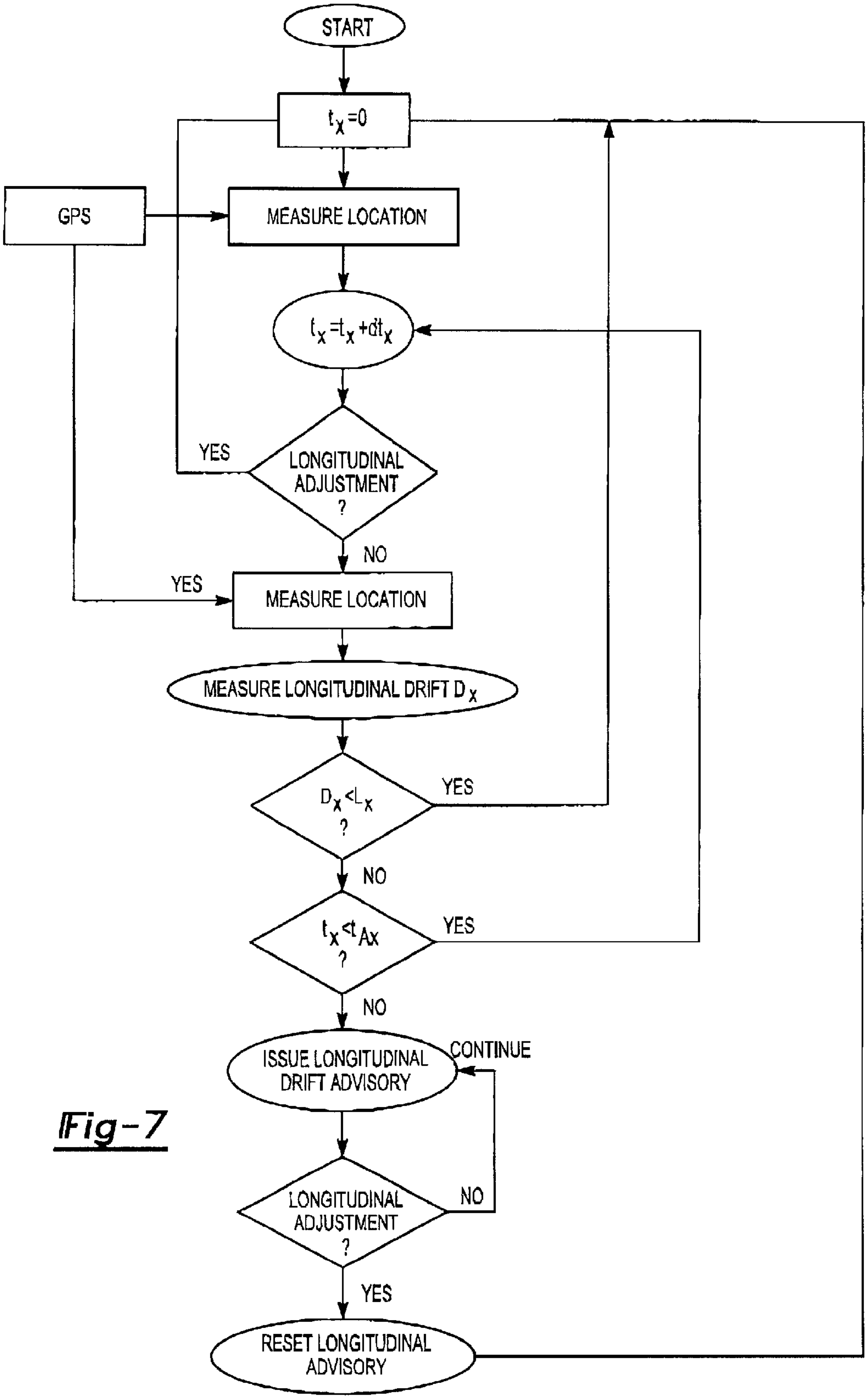
FIG. 7 is a flow chart of the drift advisory system for longitudinal drift according to an illustrative embodiment of the present invention.

A detailed functional description of the illustrative embodiment of the present invention as applied to longitudinal drift is now discussed with reference to FIG. 7. In alternative embodiments, this description can be applied to lateral drift as well as to longitudinal drift.

The longitudinal drift calculation starts (701) with an initialization of time to $t_x=0$ (702). The processor obtains the coordinates of the aircraft's location (703), in this instance from the GPS (704). Time $t_x$ is incremented by $dt_x$ (705). Next, it is determined whether the pilot has adjusted the flight controls to change the aircraft longitudinal position during time interval $dt_x$ (706), e.g., whether any stick input has been introduced. If the pilot has so manipulated the controls, this is interpreted as confirmation that the pilot is aware of the aircraft's longitudinal position, and therefore, the clock on the advisory should not be running. In this case, time is reinitialized (702) and the process continues. If the pilot has not used the controls to adjust the aircraft longitudinal location, it is assumed that the pilot is not aware of any longitudinal drift that has occurred in time interval $dt_x$. A new set of aircraft coordinates is obtained (707) and the longitudinal drift distance, $D_x$ is determined (708).

The measured drift distance $D_x$ is compared to a threshold drift distance value $L_x$ (709). If $D_x$ is less than $L_x$, time is reinitialized (702). If however, $D_x$ is equal to or greater than $L_x$, a second criterion is checked. Time $t_x$, the amount of time that has passed since either $D_x$ last dropped below the criterion value of $L_x$ or since the pilot reinitialized the process by adjusting the longitudinal position of the aircraft, is compared to a criterion time interval $t_{Ax}$ (710). If $t_x$ is less than $t_{Ax}$, time is incremented and the process continues (705). If however, time $t_x$ is equal to or greater than $t_{Ax}$, the pilot is given a longitudinal drift advisory (711). The advisory continues until the pilot adjusts the aircraft longitudinal position (712) at which time the advisory is terminated (713) and time $t_x$ is reinitialized (702).

Vertical drift can be treated in a manner analogous to longitudinal drift. Vertical positions can be measured by altimeter rather than by the GPS. The advisory clock does not effectively start running until the aircraft vertical drift $D_z$ has equaled or exceeded the threshold vertical drift distance $L_z$. Time $t_z$ is compared to vertical drift threshold time $t_{Az}$ to determine whether to issue a vertical drift advisory. The pilot can reinitialize by causing the vertical location to change by use of the flight controls.

It will be readily apparent that the present invention will have applications beyond those described herein and in vehicles other that helicopters. For example, the present invention can be adapted for use in commercial airlines and automotive vehicles by implementing the principles taught herein. The drift advisory system can be adapted to commercial airplanes in a variety of applications including the prevention of runway collisions or in midair to advise a pilot of "blind spot" traffic to the rear quarter of the aircraft. Similarly on roadways, the invention can be useful in avoiding collisions among vehicles and between one vehicle and other objects or rear-oncoming traffic.

The present invention has been illustrated and described with respect to specific embodiments and applications thereof. To facilitate discussion of the present invention, a preferred embodiment is assumed, however, the above-described embodiments are merely illustrative of the principles of the invention and are not intended to be exclusive embodiments thereof. It should be understood by one skilled in the art that alternative embodiments drawn to variations in the enumerated embodiments and teachings disclosed herein can be derived and implemented to realize the various benefits of the present invention.

It should further be understood that the foregoing and many various modifications, omissions and additions may be devised by one skilled in the art without departing from the spirit and scope of the invention. It is therefore intended that the present invention is not limited to the disclosed embodiments but should be defined in accordance with the claims which follow.

I claim:

1. An aircraft drift advisory system comprising:

a navigation system adapted to measure aircraft parameters including altitude, drift velocity and drift direction;

a data processor coupled to the navigation system, the data processor being adapted to calculate a difference between an aircraft drift distance in a spatial dimension and a corresponding threshold distance;

calculate the time interval since the aircraft drift distance was last less than the corresponding threshold distance;

compare said time interval to a criterion time; and issue a drift advisory when said time interval equals or exceeds said criterion time.

2. The apparatus of claim 1 wherein said spatial dimension is a lateral dimension, said lateral dimension being oriented perpendicularly to a longitudinal axis of said aircraft and in a horizontal plane.

3. The apparatus of claim 1 wherein said spatial dimension is a longitudinal dimension, said longitudinal dimension being oriented parallel to said longitudinal axis of said aircraft and in said horizontal plane.

4. The apparatus of claim 1 wherein said spatial dimension is a vertical dimension, said vertical dimension being oriented perpendicularly to said longitudinal axis of said aircraft and perpendicularly to said horizontal plane.

5. An aircraft drift advisory method comprising:
measuring aircraft parameters including altitude, drift velocity and drift direction;
calculating a difference between an aircraft drift distance in a spatial dimension and a corresponding threshold distance;
calculating the time interval since the aircraft drift distance was last less than the corresponding threshold distance;
comparing said time interval to a criterion time; and
issuing a drift advisory when said time interval equals or exceeds said criterion time.

6. The method of claim 5 wherein said spatial dimension is a lateral dimension, said lateral dimension being oriented perpendicularly to a longitudinal axis of said aircraft and in a horizontal plane.

7. The method of claim 5 wherein said spatial dimension is a longitudinal dimension, said longitudinal dimension being oriented parallel to said longitudinal axis of said aircraft and in said horizontal plane.

8. The method of claim 5 wherein said spatial dimension is a vertical dimension, said vertical dimension being oriented perpendicularly to said longitudinal axis of said aircraft and perpendicularly to said horizontal plane.

9. An aircraft drift advisory system comprising:
an apparatus adapted to measure a perspective angle representational of a direction of a pilot's line of sight in reference to an aircraft longitudinal axis;
a navigation system adapted to measure aircraft parameters including altitude, drift velocity and drift direction;
a data processor coupled to the apparatus and the navigation system, the data processor being adapted to
define a foveal cone comprising a cone swept out by a foveal angle rotated about the line of sight;
calculate a risk measure whenever the drift direction is not contained within the foveal cone;
issue a drift advisory when the risk measure equals an advisory criterion.

10. The system of claim 9 wherein the risk measure is a drift distance, the drift distance being calculated by integrating the drift velocity over time.

11. The system of claim 9 wherein the navigation system comprises a global positioning system adapted to provide an aircraft location as projected on the earth surface and the drift velocity.

12. The system of claim 11 wherein:
the data processor is in communication with a terrain map containing a detailed digital topographic description of an earth surface; and
the risk measure is an approach distance to a nearest object as determined from the aircraft location and the terrain map.

13. The system of claim 9 wherein the apparatus is a head tracking device and the perspective angle is a rotational orientation of the pilot's head.

14. The system of claim 9 wherein the apparatus is an eye tracking device and the perspective angle is a rotational orientation of the pilot's line of sight.

15. The system of claim 9 wherein the advisory criterion is a predetermined function of the aircraft altitude.

16. The system of claim 9 wherein the drift advisory is a visual advisory.

17. The system of claim 9 wherein the drift advisory is an auditory advisory.

18. An aircraft drift advisory method comprising:
measuring a perspective angle representational of a direction of a pilot's line of sight in reference to an aircraft longitudinal axis;
measuring aircraft altitude, drift velocity and drift direction;
defining a foveal cone comprising a cone swept out by a foveal angle rotated about the line of sight;
calculating a risk measure whenever the drift direction is not contained within the foveal cone;
issuing a drift advisory when the risk measure equals an advisory criterion.

19. The method of claim 18 wherein the risk measure is a drift distance, the drift distance being calculated by integrating the drift velocity over time.

20. The method of claim 18 wherein a global positioning system is used to provide an aircraft location as projected on the earth surface and the drift velocity.

21. The method of claim 20 wherein:
a terrain map is used to determine an approach distance to a nearest object from the aircraft location; and
the risk measure is the approach distance to a nearest object.

22. The method of claim 18 wherein a head tracking device is used to determine the perspective angle and the perspective angle is a rotational orientation of the pilot's head.

23. The method of claim 18 wherein an eye tracking device is used to determine the perspective angle and the perspective angle is a rotational orientation of the pilot's line of sight.

24. The method of claim 18 wherein the advisory criterion is a predetermined function of the aircraft altitude.

25. The method of claim 18 wherein the drift advisory is a visual advisory.

26. The method of claim 18 wherein the drift advisory is an auditory advisory.

27. The apparatus as recited in claim 1, wherein said aircraft parameters are measured relative an initial hover position of the aircraft.

28. The apparatus as recited in claim 1, wherein said time interval is reset in response to a control input correlating to the drift direction.

29. A method as recited in claim 5, further comprising measuring the aircraft parameters relative an initial hover position of the aircraft.

30. A method as recited in claim 29, further comprising the step of resetting said time interval if the aircraft drift distance becomes less than the threshold distance from the initial hover position within the criterion time.

31. A method as recited in claim 5, further comprising resetting said time interval in response to a control input correlating to the drift direction.

32. The system as recited in claim 9, wherein said aircraft parameters are measured relative an initial hover position of the aircraft.

33. A system as recited in claim 9, wherein the apparatus adapted to measure a perspective angle representational of a direction of a pilot's line of sight measures the perspective angle through an angle greater than the foveal angle.

34. A method as recited in claim 18, further comprising the step of measuring aircraft altitude, drift velocity and drift direction relative an initial hover position of the aircraft.

35. A method as recited in claim 18, further comprising the step of measuring a pilot orientation to define the perspective angle, the pilot orientation measurable through an angle greater than the foveal angle.

* * * * *